United States Patent
Pinkham (10) Patent No.: US 7,319,949 B2
(45) Date of Patent: Jan. 15, 2008

(54) UNILINGUAL TRANSLATOR

(75) Inventor: Jessie Pinkham, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/445,534

(22) Filed: May 27, 2003

(65) Prior Publication Data

US 2004/0243390 A1    Dec. 2, 2004

(51) Int. Cl.
*G06F 17/28* (2006.01)
(52) U.S. Cl. .............................. 704/3; 704/2
(58) Field of Classification Search .................... 704/3
See application file for complete search history.

(56) References Cited

U.S. PATENT DOCUMENTS

| | | | | |
|---|---|---|---|---|
| 5,408,410 A | * | 4/1995 | Kaji .............................. | 704/2 |
| 5,497,319 A | * | 3/1996 | Chong et al. .................. | 704/2 |
| 5,677,835 A | * | 10/1997 | Carbonell et al. ............. | 704/8 |
| 6,349,276 B1 | * | 2/2002 | McCarley ....................... | 704/8 |

OTHER PUBLICATIONS

Bangalore, S.; et al. "Bootstrapping Bilingual Data using Consensus Translation for a Multilingual Instant Messaging System" International Conference in Computational Linguistics (COLING 2002), Taipei, Taiwan, Nov. 2002.
Callison-Burch, C.; "Co-training for Statistical Machine Translation", Master of Science, Division of Informatics, University of Edinburgh, 2002.
Bangalore, S.; et al. "Computing Consensus Translation From Multiple Machine Translations Systems", Proceedings ASRU 2001, Dec. 9-13, 2001, pp. 351-354.
Richardson, Dolan, Menezes and Pinkham, "Achieving commercial quality translation with example-based methods", Sep. 18, 2001.
Menezes and Richardson, "A best-first alignment algorithm for automatic extraction of transfer mappings from bilingual corpora", Sep. 18, 2001.
Pinkham and Corston-Oliver, "Adding Doman Specificity to an MT System", Jul. 2001.
Dolan, Pinkham and Richardson, "MSR-MT: The Microsoft Research Machine Translation System", Oct. 6, 2002.
Richardon, Dolan and Vanderwende, "MindNet: acquiring and structuring semantic information from text", May 1998.
Pinkham, Corston-Oliver, Smets and Pettenaro, "Rapid assembly of a large-scale French-English MT system", Sep. 18, 2001.

(Continued)

*Primary Examiner*—David Hudspeth
*Assistant Examiner*—Justin W. Rider
(74) *Attorney, Agent, or Firm*—Joseph R. Kelly; Westman, Champlin & Kelly, P.A.

(57) ABSTRACT

A machine translator trained with textual inputs generated by other machine translators is disclosed. A textual input in a first language is provided by a user or other source. This textual input is then translated by a first machine translator to generate a translated version of the textual input in a second language. The textual input and the translated version are parsed and passed through a training architecture to develop a transfer mapping, and a bilingual dictionary. These components are then used by a second machine translator when translating other textual inputs.

24 Claims, 6 Drawing Sheets

OTHER PUBLICATIONS

Aikawa, Melero, Schwartz and Wu, "Generation for Multilingual MT", Sep. 18, 2001.

Robert C. Moore, "Towards a Simple and Accurate Statistical Approach to Learning Translation Relationships among Words", Jul. 2001.

Japanese Official Notice, JP Patent Application No. 2004-156806, mailed Sep. 18, 2007.

Japanese Official Notice, JP Patent Application No. 2004-156806, mailed Jun. 19, 2007.

* cited by examiner

UNILINGUAL TRANSLATOR

BACKGROUND OF THE INVENTION

The present invention relates to learning relationships among words. More specifically, the present invention relates to a method of training a machine translator using bilingual text.

Machine translation is a process utilizing computer software and components to translate text from one language, such as German, French, or Japanese, into a second language, such as English, Spanish, or Arabic. Machine translation is anything but a straightforward process. Machine translation is not simply substituting one word for another, but is based upon knowing all of the words that comprise the give text, and how one word in the text influences other words in the text. However, human languages are complex and consist of several characteristics, such as morphology, syntax or sentence structure, semantics, ambiguities and irregularities. In order to translate between the two languages a machine translator must account for the grammatical structure of each of the languages. Further, it must use rules and assumptions to transfer the grammatical structure of the first language (source) into the second language (target).

However, given the complexities involved in languages, machine translation tends to be only between 30% and 65% accurate. Many phrases and colloquial terms do not translate easily. Attempts to translate the names of places, people, scientific words, etc. are made when they should not be translated. Rules which are hard-coded for certain grammatical features may always be applied, even though many exceptions to the rules exist, since writing code for all the exceptions would be a prolonged task, resulting in a slow translation process. So a document translated by current machine translation techniques may or may not even be understandable to a user; worse yet, some important elements of the document may be translated incorrectly.

Machine translators are only as good as the training data used to train the system. Machine translators are usually trained by using human authored translations. These translations are fed through a training architecture that identifies various pairs of words that are related. These word pairs are often the translations for the words in the text, but sometimes these words are not exact translations of the related words. Other machine translators are trained using data from a bilingual dictionary. However, training from these type of translations is not always the best way to train a machine translator, as the translations can lead the translator to chose the wrong word in a given circumstance.

One problem with using human authored translations to train a machine translator is that the translations are often not translations in the true sense of the word, but are more like interpretations of the text. For example, in Canada, parliamentary debates provide a ready source of human authored translated data that can be used to train a machine translator. However, these translations are often not true translations. Hence they do not provide training data to the machine translator to a level necessary to generate accurate translations.

The accuracy problem with machine translation can be explained by a simple-example. Using presently available machine translation, if a user was to translate a sentence from English to French, a certain degree of inaccuracy would be involved. In translating the sentence back to English using machine translation, the original translation inaccuracy is amplified, and the sentence will in most instances be different than the original English sentence. Take for example the following statement from a Canadian debate.

Mr. Hermanson: On a point of order, Mr. Speaker, I think you will find unanimous consent to allow the leader of the Reform Party, the hon. member for Calgary Southwest, to lead off this debate, and the hon. member for Red Deer would then speak in his normal turn in the rotation.

Which was translated by a human translator into French as:

M. Hermanson: J'invoque le Règlement, monsieur le Président. Je pense que vous trouverez qu'il y a consentement unanime pour que le chef du Parti réformiste, le député de Calgary-Sud-Ouest, engage ce débat et que le député de Red Deer prenne ensuite la parole quand ce sera son tour.

Which translates back to English as:

I call upon the requirement, Mr. President. I think that you will find that there is a unanimous consent to the proposition that the head of the reformist party, the member from Calgary-Southwest start this debate, and that the member from Red Deer makes his statement when it is his turn.

However, when translated back to English using a machine translator it becomes:

I call upon the Payment, Mr. President Président. I think that you will find that there is unanimous assent so that the chief of the Party reformist, the deputy of Calgary-South-West, engages this debate and that the deputy of Red Deer speaks then when it is its turn.

As can be seen from the above example, the quality of a machine translation leaves much to be desired. The reliance on human authored translations tends to make the machine translator dependent upon interpretations as opposed to translations, when learning the relationship between words. Also there are a limited number of materials that are available for use as training data. (e.g. Bibles, debates at bilingual or multilingual organizations, and other documents that are specifically created in a bilingual format.) Further, to generate more translated documents to use for training a machine translator is an expensive process, that still does not provide enough accuracy to effectively train the machine translator. Therefore, it is desirable to train a machine translator with a large amount of translated data at a minimum of cost, while preserving or enhancing the accuracy of the machine translator.

SUMMARY OF THE INVENTION

The present invention is directed to a machine translator that is trained by textual inputs derived by other machine translators. A textual input in a first language is provided by a user or other source. This textual input is then translated by a machine translator and generates a translated version of the textual input in a second language. The machine translator used for this translation is a prior art type of machine translator that is trained using a human authored aligned bilingual corpi, trained using a bilingual dictionary or both.

Both the textual input and the translated version of the text are provided to an aligning component. This aligning component can be part of a training architecture or can be a stand alone component. The aligning component pairs words or phrases in the textual input with words and phrases in the translated version of the textual input. These pairs are then converted into logical forms. Following the derivation of the pairs for the textual input, the pairs are processed by the training architecture. The textual input from the machine translator can be supplemented with data from human authored sources or bilingual dictionaries.

The training architecture is configured to learn from imperfect translations generated by the machine translator through the use of a robust parser that gives reasonable logical forms from even flawed input. The training architecture builds a transfer mapping database which contains transfer mappings that link the logical forms, or parts thereof, in the source language, to logical forms, or parts thereof, in the second language. Once the transfer mapping database is created, the results are provided to a second machine translator.

The second machine translator is configured to translate a textual input from a first language to a second language using the transfer mappings developed by the training architecture. During the translation process a textual input is provided in a source language to second machine translator. The second machine translator receives the textual input and generates source logical forms for each word in the textual input using an analysis component.

Following the generation of the source logical forms, a matching component in the second machine translator matches the source logical forms with logical forms in the transfer mapping database. Links are then created on nodes of the source logical form to copies of the corresponding target logical form segments. Target logical forms are then created by performing a top down traversal of the linked logical form. The target logical form segments pointed to by the links on the source logical form nodes are combined. Following the mapping process the target logical forms are mapped into a target sentence and a translation of the textual input is generated and output from the second machine translator in the target language.

DETAILED DESCRIPTION OF ILLUSTRATIVE EMBODIMENTS

Figure 1:
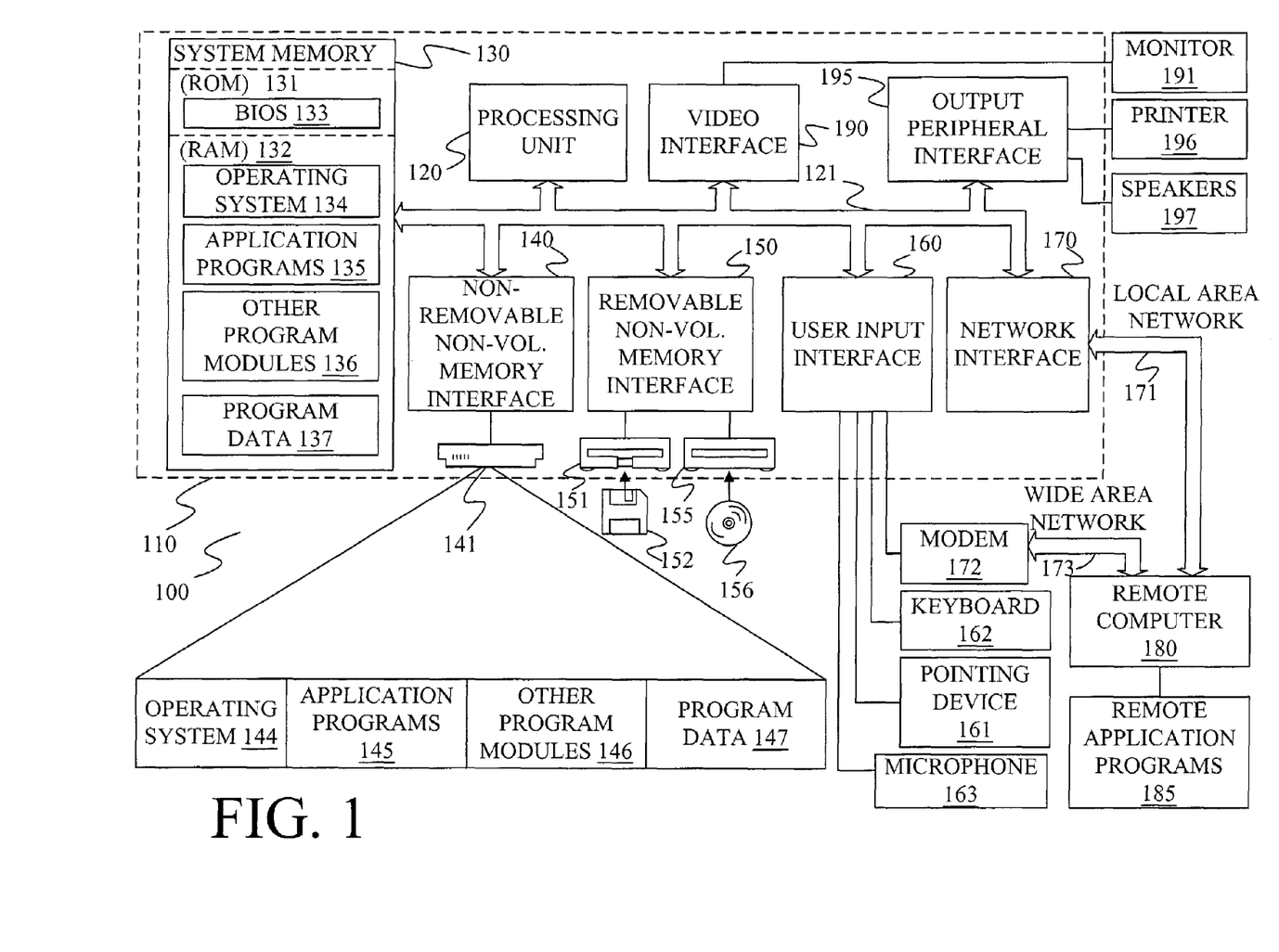
FIG. 1 is a block diagram illustrating one environment in which the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2A:
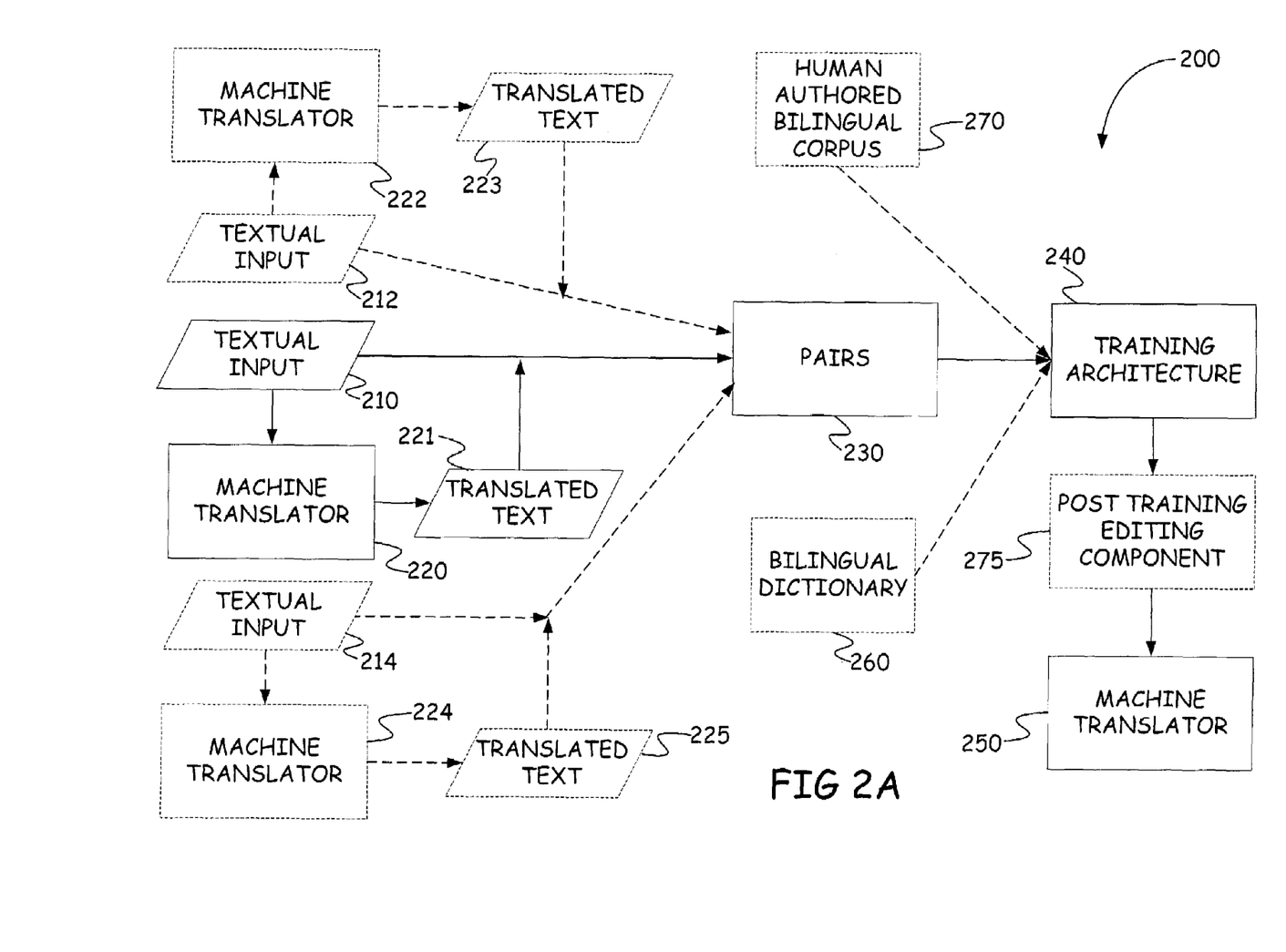
FIG. 2A is a block diagram illustrating the training architecture of the present invention.

While logical forms are not required for the present invention, they are discussed in relation to the machine translation architecture shown in FIG. 2. Therefore, prior to discussing that architecture in greater detail, a brief discussion of a logical form will be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological analysis on an input text to produce conventional phrase structure analyses augmented with grammatical relations. Syntactic analyses undergo further processing in order to derive logical forms which are graph structures that describe labeled dependencies among content words in the textual input. Logical forms normalize certain syntactical alternations, (e.g., active/passive) and resolve both intrasentential anaphora and long distance dependencies.

Specifically, a logical relation consists of two words joined by a directional relation type (e.g., Part, Time, Hypernym, LogicalSubject, Cause, Domain, Location, Manner, Material, Means, Modifier, Possessor, Purpose, Quasihypernym, Synonym, LogicalObject, and User). A logical form is a graph of connected logical relations representing a single textual input, such as a sentence. It minimally consists of one logical relation. The logical form portrays structural relationships (i.e., syntactic and semantic relationships), particularly argument and/or adjunct relation between important words in an input string.

In one illustrative embodiment of the machine translation architecture, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations.

Figure 2B:
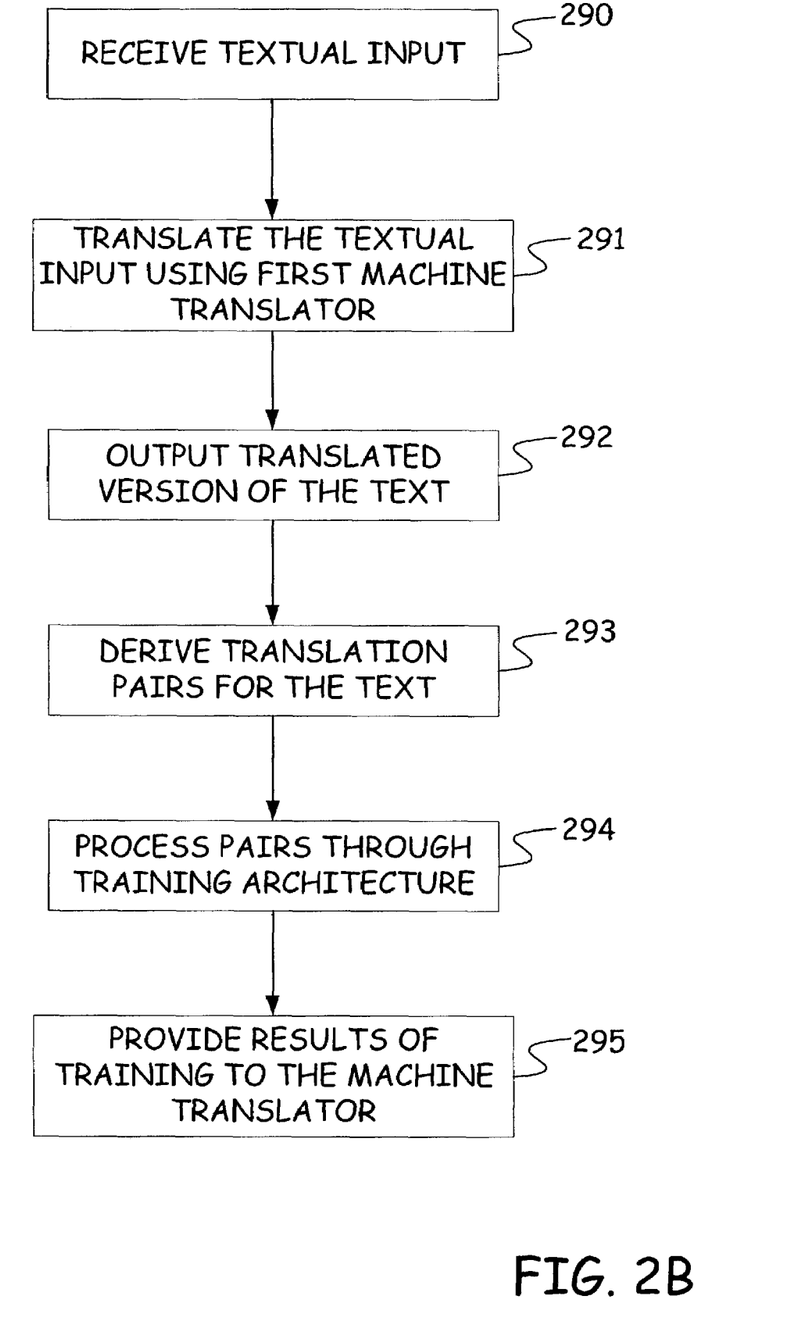
FIG. 2B is a flow diagram illustrating the steps performed during the training process.

FIG. 2A illustrates an exemplary architecture for training a machine translator according to one embodiment of the present invention. FIG. 2B is a flow diagram illustrating the step executed during the training process. FIGS. 2A and 2B will be discussed together. Training system 200 includes an input text 210, a first machine translator 220, translation pairs 230, a training architecture 240, and a second machine translator 250. Optionally training system 200 can include additional machine translators 222 and 224, a human authored bilingual corpus 270, and a bilingual dictionary 260. Machine translator 250 is similar to the first machine translator 220, except that machine translator 250 is trained using training data from other machine translators, while first machine translator 220 is trained using a traditional prior art method of training. The operation of machine translator 250 will be discussed in more detail with regards to FIGS. 4 and 5.

First machine translator 220 in one embodiment can be any currently existing machine translator. However, other machine translators can be used for first machine translator 220. The first machine translator 220 receives the textual input 210 in a first (or source) language. This is illustrated at step 290. This textual input 210 is translated from the source language to a target language (for example German to English or Spanish to English) according to the internal programming structure for the machine translator 220. This is illustrated at block 291. The translated version of the textual input 210 is output from machine translator 220 as translated text 221 at block 292. Following the translation of the textual input 210 by first machine translator 220 the textual input 210 and output 221 are combined with each other to derive translation pairs 230 for the textual input. This is illustrated at block 293. An illustrative example of a method of deriving the translation pairs 230 at block 293 is described below. However other methods of deriving translation pairs 230 can be used. Further, in one embodiment the generation of translation pairs 230 is a component of the training architecture 240. However, depending on the arrangement and programming of training architecture 240 the generation of translation pairs 230 can be accomplished through a component separate from the training architecture 240.

Illustratively the translation pairs 230 are generated, in one embodiment from an aligned bilingual corpus. The bilingual corpus includes aligned translated sentences from text 210 and 221 (e.g., sentences in a source or target language, such as English, aligned with their translations in the other of the source or target language, such as German.). During pairing, the sentences are fed from the aligned bilingual corpus into training architecture 240 as source sentences from textual input 210 (the sentences to be translated), and as target sentences from the translated text 221 (the translation of the source sentences).

The aligned corpus is parsed into its component words (e.g., lemmas as discussed above, but it could also be maintained in surface form). The aligned corpus is parsed into source and target logical forms. However, the present invention is not confined to operating on textual inputs that are parsed into logical forms, but instead simply needs to have the aligned corpus parsed into its content words. Additionally, certain lexical compounds can be identified as if they are single units. If such multi-word expressions are placed in the lexicon, because they have a specific meaning or use, or because they are in one of a number of general categories such as proper names, names of places, time expressions, dates, measure expressions, etc., they are identified as multi-words.

Next a word association scores for individual word pairs in the aligned, parsed, bilingual corpus is calculated. Any word association metric can be used that provides a score indicative of a statistical word association between word pairs in the training corpus. For example, the log-likelihood-ratio statistic discussed by Dunning in Dunning, *Accurate Methods for the Statistics of Surprise and Coincidence, Computational Linguistics,* 19(1):61-74(1993) can be used.

The list of word pairs for which association scores are computed can also be pruned. In other words, the process of computing the word association scores generates association scores for a large number of word (or lemma) pairs for a large training corpus. Therefore, in one illustrative embodiment, the set of word pairs is pruned to restrict further processing to those pairs having at least some chance of being considered as translation pairs 230. One illustrative heuristic sets this threshold to be the degree of association of a pair of words or lemmas that have one co-occurrence, plus one other occurrence each.

Next the occurrence of compounds in the training data are hypothesized and replaced with a single token. The association scores for the rewritten input text (i.e., the compounds and any remaining individual words) are recalculated and rewritten.

Then the association scores are again recomputed. However, this time, only co-occurrences are taken into account where there is no equally strong or stronger other association in the aligned sentences. In other words, assuming that all of the compounds needed for translation have been correctly identified and reformulated in the training data as a single item, the training data can be treated as if all translations are 1-to-1. Therefore, the final set of ranked translation pairs are chosen on the assumption that true translation pairs will always be mutually most strongly associated in a given aligned sentence pair. The final set of associations is then sorted in decreasing order according to the strength of association.

Finally, those pairs of words and/or compounds that have association scores above a threshold in the final list are identified as translations of one another. The threshold can be empirically chosen, or it can be chosen based on a linguistic analysis of the results provided in the final pair list, or it can be chosen using another desired technique.

Referring back to FIGS. 2A and 2B, following the derivation of the translation pairs 230 for the textual input 210, the pairs are processed by the training architecture 240. This is illustrated at block 294. in one embodiment, the training architecture 240 is able to learn from the imperfect translations generated by the machine translator 220 through the use of a robust parser that gives reasonable logical forms from even flawed input. Training architecture 240 builds a transfer mapping database which contains transfer mappings that basically link the logical forms, or parts thereof, in one language, to logical forms, or parts thereof, in the second language.

Once the transfer mapping database is created, the results are provided to machine translator 250 at block 295. A brief description of one exemplary training architecture 240, which can be used to train the machine translator 250 is provided below and described with respect to FIG. 3. However, other methods of training machine translator 250 can be used.

Figure 3:
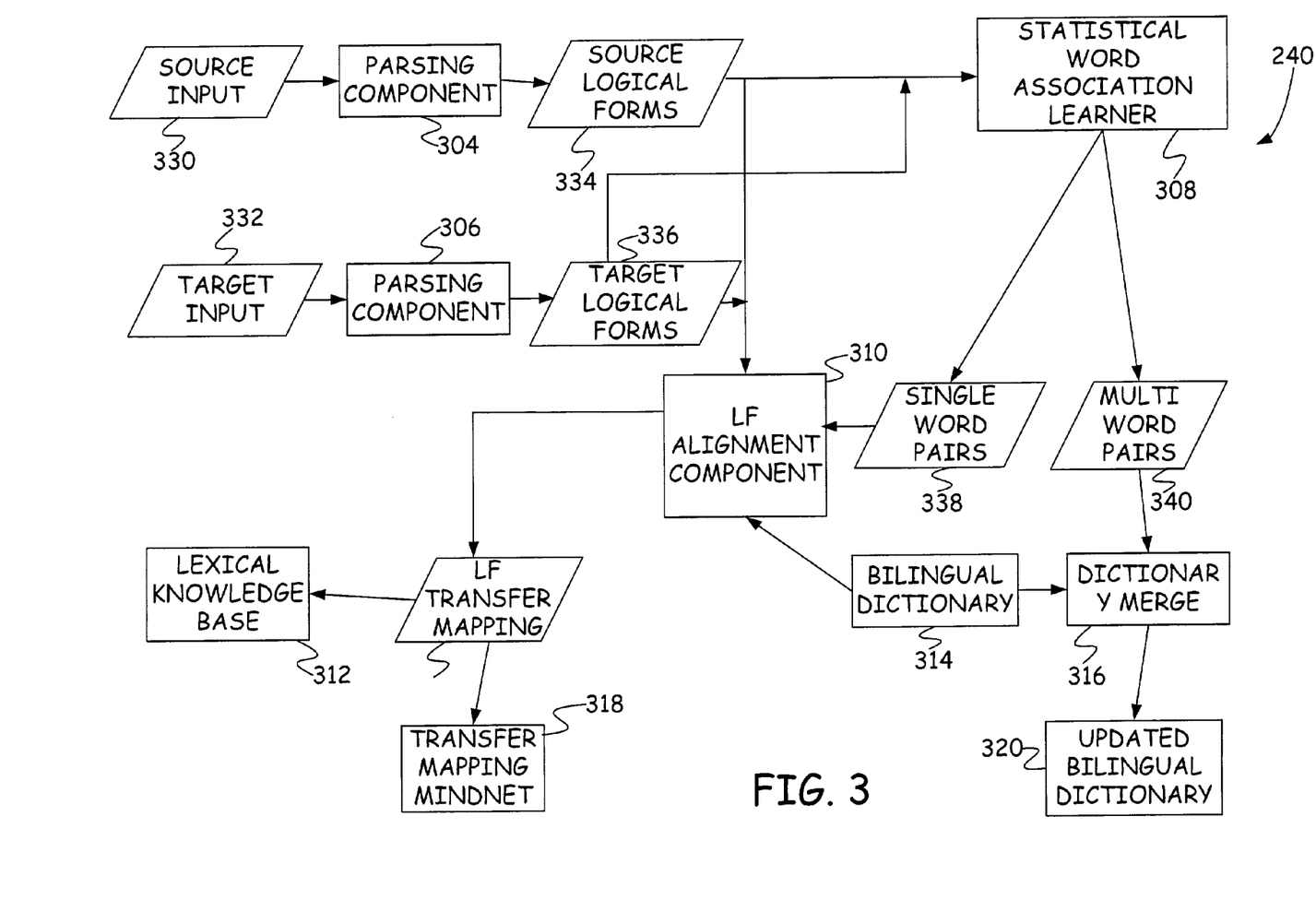
FIG. 3 is a block diagram illustrating a training architecture according to one embodiment of the present invention.

FIG. 3 is a block diagram of training architecture 240 according to one exemplary embodiment of the present invention. Training architecture 240 includes parsing components 304 and 306, statistical word association learning component 308. Logical form alignment component 310, lexical knowledge base building component 312, bilingual dictionary 314, dictionary merging component 316, transfer mapping database 318 and updated bilingual dictionary 320.

As discussed above a bilingual corpus is used to train the system. The bilingual corpus includes aligned translated sentences (e.g., sentences in a source or target language, such as English, aligned with their translations in the other of the source or target language, such as Spanish or French, etc.). During training, sentences are fed from the aligned bilingual corpus into training architecture 240 as source sentences 330 (the sentences to be translated), and as target sentences 332 (the translation of the source sentences). Parsing components 304 and 306 parse the sentences from the aligned bilingual corpus to produce source logical forms 334 and target logical forms 336. During parsing, the words in the sentences are converted to normalized word forms (lemmas). The term "lemma" as used herein refers to a stem or root word for a content word. For example, "sleep" is the lemma for the surface forms "sleep", "sleeping" and "slept." It should be noted that the training architecture can be applied to surface forms instead of content word lemmas, but performance may suffer somewhat. In any case, the lemmas are then fed into statistical word association learning component 308. Both single word and multi-word associations are iteratively hypothesized and scored by learning component 308 until a reliable set of each is obtained. Statistical word association learning component 308 outputs learned single word translation pairs 338 as well as multi-word pairs 340.

The multi-word pairs 340 are provided to a dictionary merge component 316 that is used to add additional entries into bilingual dictionary 314 to form updated bilingual dictionary 320. The new entries are representative of the multi-word pairs 340.

The single word pairs 338, along with source logical forms 334 and target logical forms 336 are provided to logical form alignment component 310. Component 310 first establishes tentative lexical correspondences between nodes in the source and target logical forms 330 and 336, respectively. This is done using translation pairs from a bilingual lexicon (or bilingual dictionary) 314 which are augmented with the single word translation pairs 338 from statistical word association learning component 308. After establishing possible correspondences, alignment component 310 aligns logical form nodes according to both lexical and structural characteristics and creates logical form transfer mappings 342.

Basically, alignment component 310 draws links between logical forms using the bilingual dictionary information 314 and single word pairs 338. The transfer mappings are filtered based on a frequency with which they are found in the source and target logical forms 334 and 336 and are provided to a lexical knowledge base building component 312.

In one example, if the transfer mapping is not seen at least twice in the training data, it is not used to build transfer mapping database 318, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 312 builds transfer mapping database 318 which contains transfer mappings that basically link logical forms, or parts thereof, in one language, to logical forms, or parts thereof, in the second language.

In alternative embodiments additional translation pairs 230 can be created through the use of additional machine translators. Referring back to FIG. 2A, machine translators 222 and 224 represent these additional machine translators. Machine translators 222 and 224 are different machine translators than the first machine translator 220. Textual inputs 212 and 214 are provided to machine translators 222 and 224, respectively. Textual inputs 212 and 214 can be identical to textual input 210, or they can be different from textual input 210. Using an identical textual input for each of the machine translators 220, 222, and 224 allows the training architecture 240 to learn the correct translation for the word.

Machine translators 222 and 224 generate translations for the textual inputs 212 and 214. These translations are represented at blocks 223 and 225. As machine translators 222 and 224 are different than machine translator 220 different translation results can be achieved for the same textual input. This variance in the translations is often due to the training received by each of the machine translators. Often a machine translator is generated to handle a specific subject of text, that another machine translator is not designed to handle.

Also when the training architecture 240 is used to train the machine translator 250 optional, additional sources of translated data can be provided to the training architecture. These additional data pieces can include a human authored bilingual corpus 260, and a bilingual dictionary 270. Human authored bilingual corpi are the usual method used to train a machine translator. The corpus is generally a translated version of a transaction such as a parliamentary debate, or a contract, but may be any translated text. The bilingual dictionary 270 is generally a dictionary listing word equivalents in the source and target languages (e.g. "Fenster" in German is "Window" in English). When these additional pieces of data are present the training architecture assesses the information provided by the bilingual corpus 260 and the bilingual dictionary 270 and trains the machine translator using the same process used for the translation pairs 230 generated for the textual input 210.

Following the training of machine translator 250 through the training architecture 240, the translation mapping can be edited by an optional post training editing component 275. Post training editing component 275 can edit the mapping by removing invalid lexical information or links within the lexical knowledge base.

Figure 4:
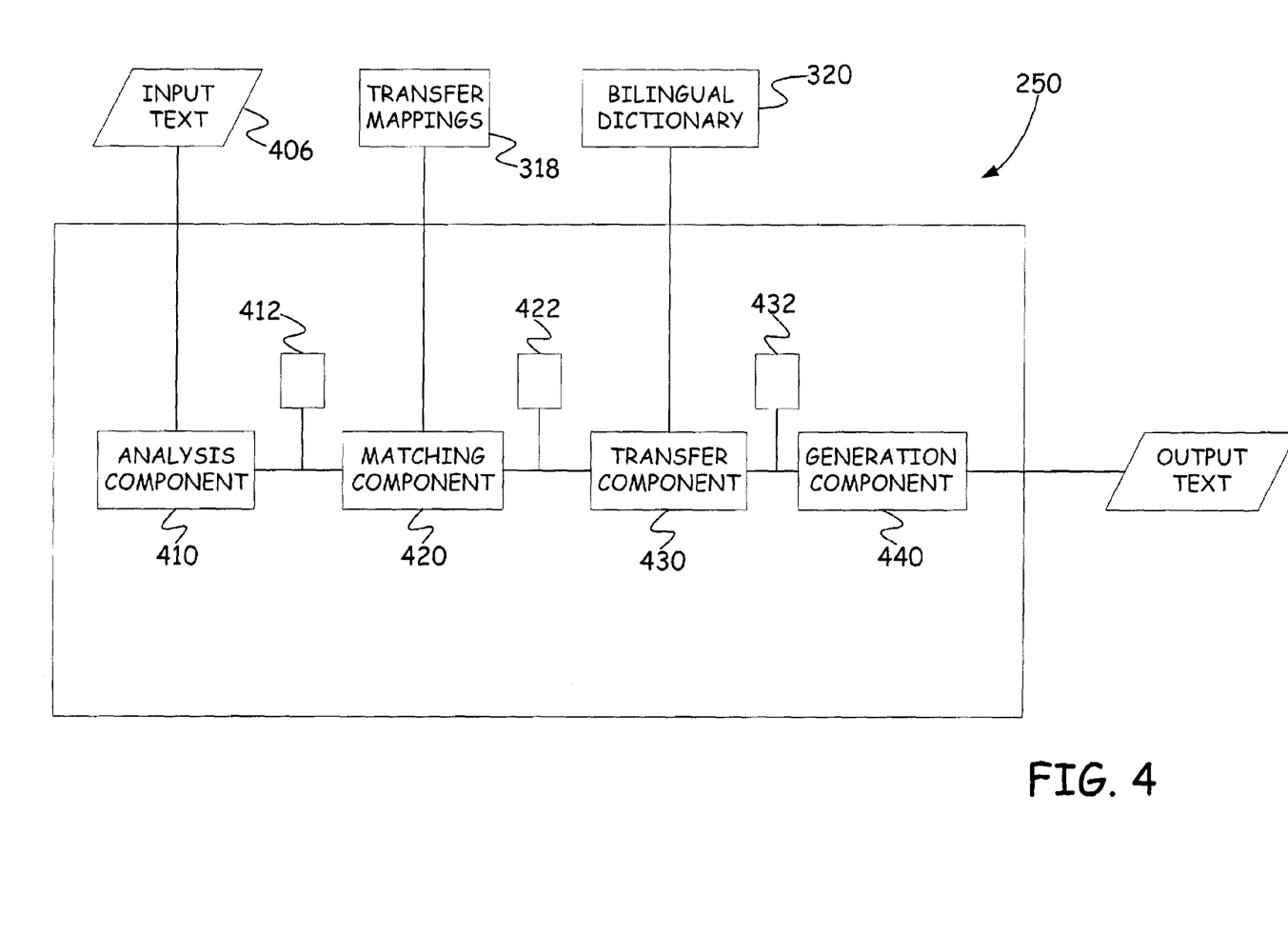
FIG. 4 is a block diagram illustrating in greater detail the machine translator illustrated in FIG. 2A.

FIG. 4 illustrates the components that comprise the machine translator 250 illustrated in FIG. 2. Machine translator 250 comprises an analysis component 410, a matching component 420, a transfer component 430 and a generation component 440. These components are invoked when machine translation is translating a textual input.

Analysis component 410 is configured to receive a source sentence 406 and to create a source logical form 412 based upon the source sentence input. This source logical form 412 is provided to the matching component 420.

Matching component 420 is configured to match the source logical form 412 to logical forms in the transfer mapping database 318 of FIG. 3. With the information matched in transfer mapping database 318, matching component 420 obtains a linked logical form 422 for the source logical form 412. Multiple transfer mappings may match portions of source logical form 412. Matching component 420 searches for the best set of matching transfer mappings in database 318 having matching lemmas, parts of speech, and other feature information. Larger (more specific) transfer mappings may illustratively be preferred to smaller (more general) transfer mappings. Among mappings of equal size, matching component 420 may illustratively prefer higher frequency mappings. Mappings may also match overlapping portions of the source logical form 412 provided that they do not conflict in any way.

Matching component 420 is also configured to create links on nodes in the source logical form 412 to copies of the corresponding target logical form segments received by the transfer mappings, to generate linked logical form 422.

Transfer component 430 is configured to receive linked logical form 422 from the matching component 420. Transfer component 430 is also configured to create a target logical form 432 that forms the basis of the target translation. This is done by performing a top down traversal of the linked logical form 422 in which the target logical form segments pointed to by links on the source logical form 412 nodes are combined. When combining together logical form segments for possibly complex multi-word mappings, the sublinks set by matching component 420 between individual nodes are used to determine correct attachment points for modifiers, etc. Default attachment points are used if needed.

In cases where no applicable transfer mappings are found, the nodes in source logical form 412 and their relations are simply copied into the target logical form 432. Default single word translations may still be found in transfer mapping database 318 for these nodes and inserted in target logical form 432. However, if none are found, translations can illustratively be obtained from updated bilingual dictionary 320 that was used during alignment.

Generation component 440 is illustratively a rule-based, application-independent generation component that maps from target logical form 432 to the target string (or output target sentence). Generation component 440 may illustratively have no information regarding the source language of the input logical forms, and works exclusively with information passed to it by transfer component 430. Generation component 440 also illustratively uses this information in conjunction with a monolingual (e.g., for the target language) dictionary to produce a target sentence 446. One generic generation component 440 is thus sufficient for each language.

Figure 5:
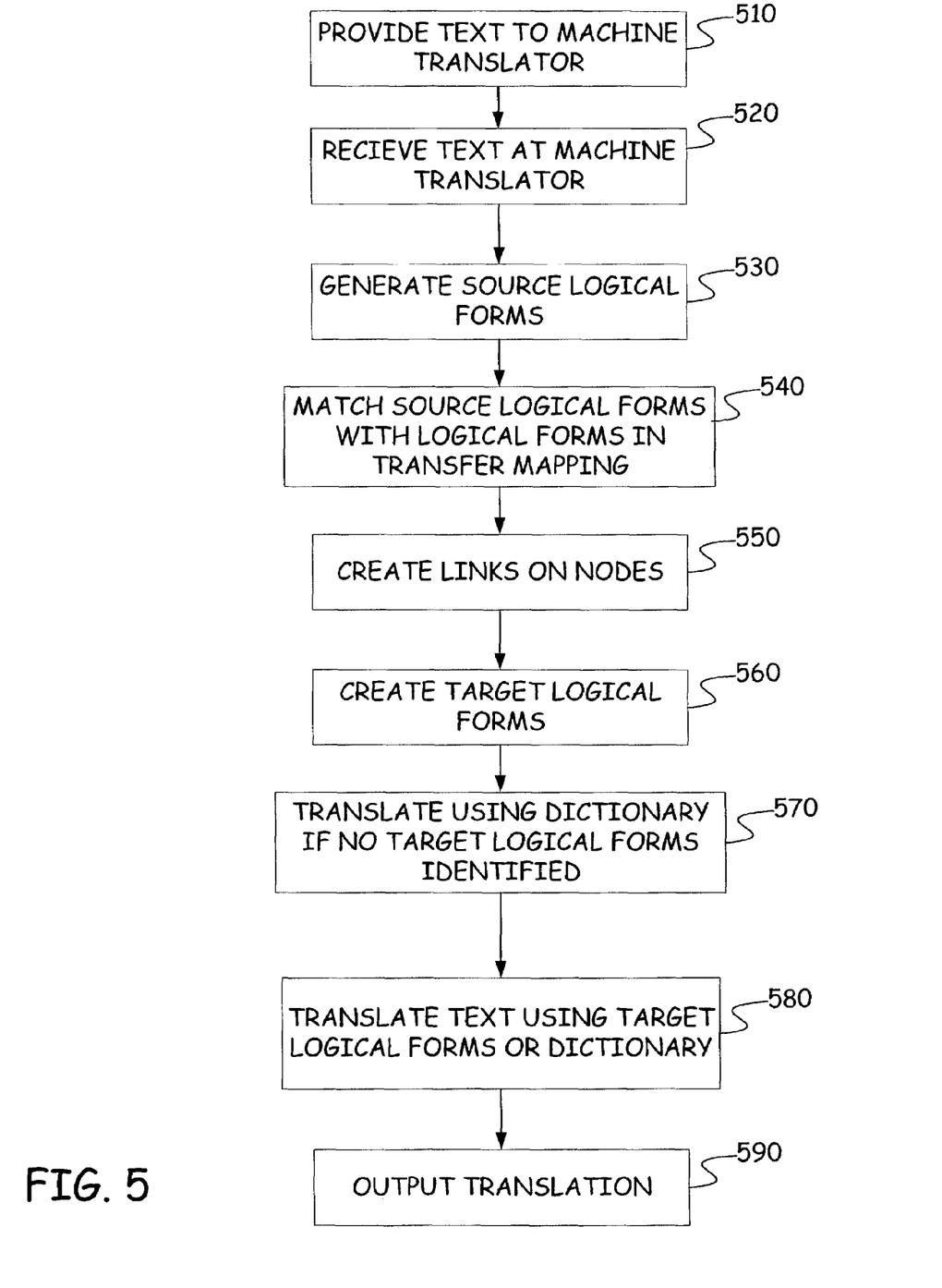
FIG. 5 is a flow diagram illustrating the steps executed by the machine translator when a textual input is provided for translation.

FIG. 5 is a flow diagram illustrating the steps executed by the machine translator 250 when a textual input is provided for translation. FIG. 5 will be discussed with reference made to components in FIG. 4.

A textual input 406 is provided to system 250. Textual input 406 is a written version of a document or other text that a user desires to translate from a source language to a target language. For example, textual input 406 can be "Para obtener mas información acerca de WSH, consulte Windows Script Host". This providing of the textual input to the machine translation system 250 is illustrated at block 510.

At block 520, the machine translator 250 receives the textual input 406 and prepares to translate the textual input 406 from Spanish to English. However other languages can be used for the translation. Next the source logical forms are generated for each word in the textual input 406 by the analysis component 410. This is illustrated at block 530.

Following the generation of the source logical forms the matching component matches the source logical forms with logical forms in the transfer mapping database. This is illustrated at block 540. Links are created on nodes of the source logical form to copies of the corresponding target logical form segments. This is illustrated at block 550. Target logical forms are created by performing a top down traversal of the linked logical form. The target logical form segments pointed to by links on the source logical form nodes are combined. This is illustrated at block 560. If no transfer mappings are found the machine translator obtains the translations form the bilingual dictionary. This is illustrated at block 570.

For example, during the processing of the above example textual input the words "para obtener" are linked as "to obtain." Whereas in a prior art machine translator the word "para" is linked as "in order" and the word "obtener" is linked as "to obtain." Further the word "información" is linked to "information" in the present invention, and linked to "data" in the prior art. This difference in the linking and mapping of the words between the two machine translators is due to the differences in the training methods for each of the machine translators.

Following the mapping process the target logical forms are mapped into the target sentence 446. So our example sentence would be translated by the machine translator 250 as "To obtain more information about WSH, consult Windows Script Host," instead of "In order to obtain more data about WSH, it consults Windows Script Host." translation that is obtained from a prior art machine translator. This translation is illustrated at block 580. The translation is outputted to the user at step 590.

Although the present invention has been described with reference to particular embodiments, workers skilled in the art will recognize that changes may be made in form and detail without departing from the spirit and scope of the invention.

What is claimed is:

1. A method of training a given machine translator comprising the steps of:
   receiving a first training sentence in a first language;
   translating the first training sentence using a first input machine translator to a first target sentence in a second language, the first input machine translator being different from the given machine translator, the first training sentence in the first language and the first target sentence in the second language comprising a first translation set; and
   training the given machine translator using the first translation set.

2. The method of claim 1 further comprising:
   prior to the training step, providing the first translation set to a training component.

3. The method of claim 1 further comprising:
   aligning words or phases in the first translation set using a pairing component.

4. The method of claim 1 further comprising:
   performing post training editing on the given machine translator.

5. The method of claim 4 wherein performing post training editing includes removing invalid lexical information from the training.

6. The method of claim 1 further comprising:
   outputting results of the training as a component of the given machine translator.

7. The method of claim 6 wherein outputting results outputs a bilingual dictionary.

8. The method of claim 6 wherein outputting results outputs a transfer mapping component.

9. The method of claim 1 wherein training the given machine translator further comprises:
   providing a human authored bilingual corpus; and
   training the given machine translator using the first translation set and the human authored bilingual corpus.

10. The method of claim 1 wherein training the given machine translator further comprises:
    providing a bilingual dictionary; and
    training the given machine translator using the first translation set and the bilingual dictionary.

11. The method of claim 1 further comprising:
providing a second input training sentence in the first language;
translating the second training sentence using a second input machine translator, different from the given machine translator and different from the first input machine translator, to a second target sentence in a second language, the second training sentence in the first language and the second target sentence in the second language comprising a second translation set; and
training the given machine translator using the first and second translation sets.

12. The method of claim 1 wherein training the given machine translator further comprises:
lexically analyzing the first textual input to obtain a dependency structure.

13. A system for translating a textual input from a first language to a second language, comprising:
a training component configured to receive a training sentence in a first language and a translated version of the training sentence in the second language, the training component also configured to create a bilingual dictionary component and a transfer mapping component based upon the training sentence and the translated version of the training sentence; and
a machine translation component configured to receive the training sentence in the first language and output another translation of the training sentence in the second language based upon information provided by the bilingual dictionary component and the transfer mapping component;
wherein the translated version of the training sentence in the second language is generated by an external machine translator, different from the machine translation component.

14. The system of claim 13 further comprising:
a bilingual dictionary including words in the first language associated with words in the second language, the bilingual dictionary configured to communicate with the training component.

15. The system of claim 13 further comprising:
an aligning component configured to pair words or phrases in the training sentence with words or phrases in the translated version of the training sentence.

16. The system of claim 15 wherein the aligning component pairs words by using logical forms.

17. The system of claim 13 further comprising:
a post training editing component configured to identify invalid lexical information created by the training component.

18. The system of claim 13 further comprising:
a human authored bilingual text having a human translated version of the training sentence in the second language, the human authored bilingual text configured to communicate with the training component.

19. The system of claim 13 wherein the training component is configured to receive the translated version of the training sentence from a plurality of external machine translators.

20. The system of claim 13 wherein the machine translator component is further configured to generate logical forms for the words and phases of the textual input.

21. A system for training a subject machine translator, comprising:
a first machine translator configured to translate a training sentence input;
a training architecture configured to receive a translated version of the training sentence input and the training sentence input, and configured to generate a component used in training the subject machine translator, the first machine translator being different from the subject machine translator; and
wherein the training sentence input and the translated version of the training sentence input comprise a first translation set.

22. The system of claim 21 further comprising:
an aligning component configured to align words or phrases in the first translation set, the aligning component configured to provide the aligned words or phases to the training architecture.

23. The system of claim 21 further comprising:
a bilingual dictionary component;
a human authored bilingual corpus; and
wherein the training architecture is further configured to generate the component based upon the first translation set, the bilingual dictionary and the human authored bilingual corpus.

24. The system of claim 21 wherein the first machine translator comprises a plurality of machine translators, each of the plurality of machine translators generating a translation set provided to the training architecture to generate the component useable by the subject machine translator.

* * * * *

UNITED STATES PATENT AND TRADEMARK OFFICE
CERTIFICATE OF CORRECTION

PATENT NO. : 7,319,949 B2  
APPLICATION NO. : 10/445534  
DATED : January 15, 2008  
INVENTOR(S) : Jessie Pinkham Page 1 of 1

It is certified that error appears in the above-identified patent and that said Letters Patent is hereby corrected as shown below:

In column 12, line 42, in Claim 3, delete "phases" and insert -- phrases --, therefor.

In column 13, line 2, in Claim 11, after "second" delete "input".

In column 14, line 16, in Claim 20, delete "phases" and insert -- phrases --, therefor.

In column 14, line 33, in Claim 22, delete "phases" and insert -- phrases --, therefor.

Signed and Sealed this

Fifteenth Day of February, 2011

David J. Kappos  
*Director of the United States Patent and Trademark Office*